July 3, 1934.                R. M. WOYTYCH                1,965,167
                          ADJUSTMENT INDICATOR
                           Filed April 11, 1932
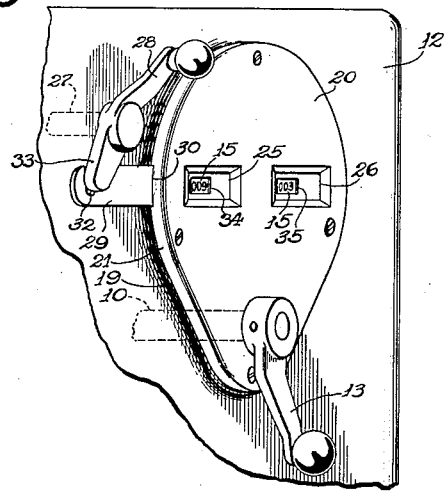
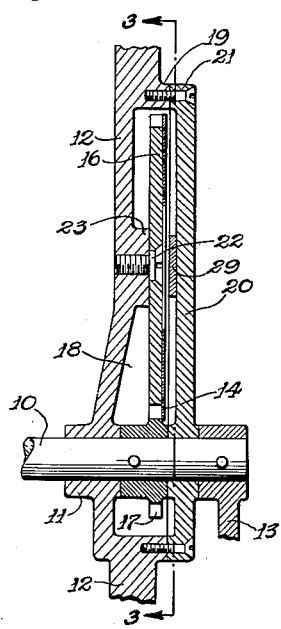
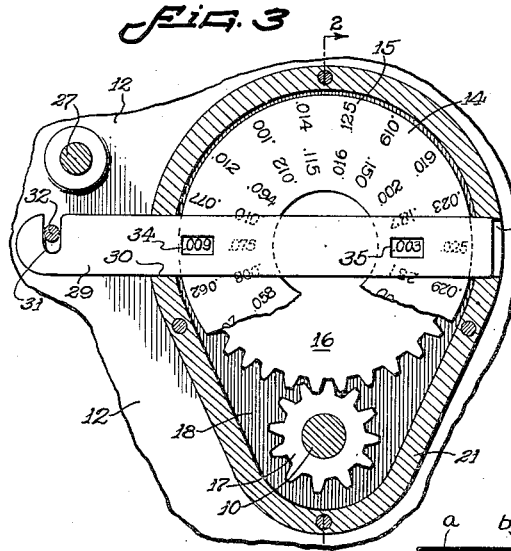
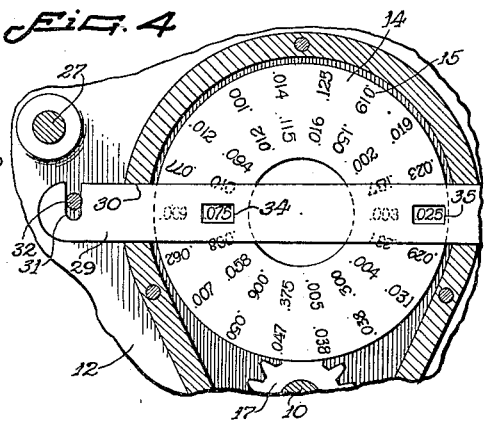
Inventor
Raymond M. Woytych
By Chindahl, Parker & Carlson
Attorneys Patented July 3, 1934

1,965,167

UNITED STATES PATENT OFFICE 1,965,167

ADJUSTMENT INDICATOR

Raymond M. Woytych, Fond du Lac, Wis., assignor to Giddings & Lewis Machine Tool Co., Fond du Lac, Wis., a corporation of Wisconsin Application April 11, 1932, Serial No. 604,639

12 Claims. (Cl. 116—124)

The present invention relates to new and improved means for indicating selective adjustments generally of various machine elements, and particularly of speed-change devices for machine tools.

One object of the invention resides in the provision of a novel indicator giving a direct reading of the composite effect of two speed-change mechanisms.

Another object is to provide a new and improved indicator having two related sets of indicia respectively for two driven machine elements, and having means for selectively exposing any two corresponding indicia of said sets simultaneously.

Further objects and advantages will become apparent as the description proceeds.

In the accompanying drawing, Figure 1 is a perspective view of the front of an indicator embodying the features of my invention.

Fig. 2 is a vertical sectional view taken along line 2—2 of Fig. 3.

Fig. 3 is a vertical sectional view taken along line 3—3 of Fig. 2 and showing the indicator in one position of adjustment.

Fig. 4 is a fragmentary view similar to Fig. 3 but showing the indicator in another position of adjustment.

Fig. 5 is a front view on a reduced scale of an index plate.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawing, the indicator comprises an element, preferably in the form of a shaft 10, which is adapted to be adjusted into any one of a plurality of positions in timed relation to the selective adjustment of a speed-change mechanism into a corresponding position. In the broad concept of the invention, the speed-change mechanism may have any suitable form and any desired number of available speeds, and may be applied to a wide range of uses.

The indicator in its preferred form is particularly adapted for a speed-change mechanism which is of the shiftable clutch and gear type adjustable by the shaft 10, and which forms part of a power drive for two machine elements, such as an axial feed drive for two spindles and deriving power from the rotative drive for the spindles, the mechanism preferably having an odd number of speeds, for example nine speeds, and one spindle preferably being rotatable at a slower speed than the other, for example at a ratio of one to three. Obviously, the axial spindle feeds may be expressed in terms of inches per revolution, and for each setting of the speed-change mechanism, the rate of feed for the low speed spindle, conveniently termed the "main spindle", will be three times that of the high speed spindle, designated as the "auxiliary spindle". Such construction is not specifically shown herein since its details form no part of the present invention, but is disclosed in a copending application by Keith F. Gallimore, Serial No. 442,055, filed April 7, 1930, (Patent No. 1,858,491).

The shaft 10 is journaled in a bearing 11 formed in the front wall of a casing 12 adapted to house the speed-change mechanism, and the associated spindles and drives, and is provided at its outer end with a hand actuator 13 for effecting the desired adjustments.

Means is provided for indicating the adjustments of the shaft 10, and more particularly the corresponding axial feed of each spindle in inches per revolution. In the present instance, this means comprises a gage 14 and a coacting member driven relatively to each other by the shaft 10, the gage having suitable indicia 15 thereon, and the member selectively designating the particular indicia corresponding to the adjustment of the shaft. Preferably, the gage 14 is a circular dial secured to the front face of a gear 16 meshing with a pinion 17 fixed on the shaft 10. The ratio between the gear 16 and the pinion 17 is such that the dial 14 will be rotated through exactly one revolution for rotation of the shaft 10 through its complete range of adjustments. In its present adaptation, the shaft 10 has nine consecutive positions in three successive revolutions, and hence the ratio of the pinion 17 to the gear 16 is 3 to 1.

The gear 16 with the dial 14 and the pinion 17 are enclosed in a recess 18 formed in the outer surface of the wall 12 and having a forwardly projecting marginal flange 19. The recess 18 is closed by a removable cover 20 having a marginal flange 21 contacting with the flange 19. The gear 16 is rotatably mounted on a pivot pin 22 threaded into a boss 23 formed on the inner wall of the recess 18.

The indicia 15 for the shaft 10 comprises two series of nine each, one series for the main spindle and the other for the auxiliary spindle, and shown respectively in columns *a* and *c* of an index member or plate 24 (see Fig. 5) adapted to be secured on the casing 12. Suitable subdivisions *f* are provided on the plate 24 for the indicia 15. Corresponding indicia 15 of the series *a* and *c* bear a ratio to each other that is the inverse of the speed ratio between the spindles. Obviously, the values of the indicia 15 may vary widely, and are determined by the various available speed ratios of the spindle feed drive. Reading downwardly, the indicia 15 in columns *a* and *c* are respectively as follows: .007, .009, .012, .014, .019, .023, .029, .038 and .047 (for main spindle), and .002, .003, .004, .005, .006, .008, .010, .012 and .016 (for auxiliary spindle). The corresponding indicia in the columns *a* and *c* are laterally alined in pairs.

The two series *a* and *c* of the indicia 15 are arranged respectively in outer and inner rows on the dial 14, and are staggered circumferentially and orientated respectively in opposite directions so that by reason of the odd number of indicia in each series, the corresponding indicia for each adjustment are located for reading at diametrically opposite points. Two spaced openings 25 and 26 are formed in the cover 20, and in relation to the dial 14 extend across both rows of indicia and are diametrically opposed to expose the two corresponding indicia, one from each row, for any given adjustment of the shaft 10. In the present instance, readings for the main spindle are made through the opening 25 and readings for the auxiliary spindle are made through the opening 26.

The indicator comprises a second adjusting element 27, preferably also in the form of a shaft, which is adapted to be adjusted into any one of a plurality of positions in timed relation to the selective adjustment of a second speed-change mechanism in series with the first speed-change mechanism in the feed drive. As in the instance of the first mechanism, the second speed-change mechanism may be of any suitable form and have any desired number of speed changes, and preferably is of the shiftable clutch or gear type adjustable by the shaft 27, and having two available speeds, thus multiplying the nine available speeds of the first mechanism to provide a total of eighteen speeds. The details of this construction are not shown herein since per se they form no part of the present invention, but are fully disclosed in said copending application.

The shaft 27 is journaled in the front wall of the casing 12, and has an actuator 28 on its outer end by means of which it may be selectively adjusted.

It will be evident that the readings of the dial 14 for each position of the shaft 10 must be multiplied by the number of positions of adjustment of the shaft 27 so as to represent all of the possible composite adjustments. Since in the present instance, the shaft 27 has but two positions of adjustment, two additional series each of nine indicia 15 are provided respectively for the main and auxiliary spindles, and are shown respectively in columns *b* and *d* of the index plate 24. The ratio of the corresponding indicia of the series *b* and *d* again is the inverse of that of the two spindles. The relation of these indicia to the corresponding indicia of the series *a* and *c* is dependent on the characteristics of the two-speed mechanism. In the present instance, the indicia 15 in the columns *b* and *d* read downwardly are as follows: .058, .075, .094, .115, .150, .187, .231, .300 and .375 (for main spindle), and .019, .025, .031, .038, .050, .062, .077, .100 and .125 (for auxiliary spindle).

On the dial 14, the indicia of series *b* are alternated with those of series *c* in the inner row, and likewise the indicia of series *d* are alternated with those of series *a* in the outer row so as to aline the corresponding indicia for each spindle laterally in sets of two for movement together into registration with the sight openings 25 and 26.

Means is associated with the dial 14 to select, in accordance with the particular adjustment of the shaft 27, one indicia of each set in registration with the sight openings 25 and 26 for any given adjustment of the shaft 10. Preferably, this means comprises a thin flat slide bar 29 extending slidably through two alined notches 30 in the flange 21, and diametrically across the dial 14 directly back of the sight openings 25 and 26. One end of the bar 29 has a slot 31 embracing a pin 32 on an arm 33 integral with the hand actuator 28. Formed in the bar 29 are two spaced sight openings 34 and 35 which respectively underlie the main openings 25 and 26 and each of which is movable into registration with one or the other of the two rows of indicia 15 in accordance with the adjustment of the shaft 27. In one position, the openings 34 and 35 respectively overlie the outer and inner rows, while in the other position, they respectively overlie the inner and outer rows. The corresponding positions of the actuator 28 are identified with the respective columns *a* to *d* in Fig. 5.

In operation, assume that a feed of .009 inches per revolution for the main spindle is desired. The index plate 24 shows that this indicia is in column *a*, and hence the actuator 28 is adjusted into its left hand position to bring the sight opening 34 over the outer row. Thereupon, the shaft 10 is rotated until the desired indicia is moved into registration with the sight openings 25 and 34 as indicated in Fig. 3.

Now assume that a feed of .025 inch per revolution for the auxiliary spindle is desired. The index plate 24 shows this indicia in column *d*, and hence the actuator 28 is adjusted into its right hand position. No adjustment of the shaft 10 is necessary since the desired indicia is already in registration with the opening 26, and hence exposed through the opening 35 as shown in Fig. 4. Thus, the indicator gives a single direct reading of the composite setting of a plurality of additive speed-change mechanisms.

Certain feeds are adapted mainly for drilling, while other feeds have been standardized for tapping threads. In Fig. 5, the tapping feeds are associated with indicia 36 defining same in terms of threads per inch. The indicia 36 are located in column *e*, the subdivisions *f* for the related indicia 15 and 36 being located side by side for mutual identification. Thus, the five auxiliary spindle feeds .050, .062, .077, .100 and .125 inch per revolution correspond respectively to 20, 16, 13, 10 and 8 threads per inch. Column *e* and the lower five subdivisions of column *d*, being that portion of the plate 24 relating to tapping, have color characteristics distinguishing from those of the remaining portion of the plate. Thus the tapping feeds have a red background while the remaining feeds have a black background.

I claim as my invention:

1. An indicator comprising, in combination, an element having a plurality of positions of adjustment, a gage having a plurality of sets of indicia, one set for each of said positions, means associated with said gage and movable relatively thereto in accordance with the adjustment of said element for selectively identifying each set upon adjustment of said element into the corresponding position, a second element having a plurality of positions of adjustment corresponding in number to certain indicia of each of said sets, and means movable in timed relation to said second element for selectively identifying the indicia of each set corresponding to the position of adjustment of said second element.

2. An indicator comprising, in combination, an actuating shaft having a plurality of rotary positions of adjustment, a dial driven from said shaft, said dial having a plurality of circumferentially spaced sets of indicia, one set for each of said shaft positions, means associated with said dial for selectively identifying each set upon adjustment of said shaft into the corresponding position, a second actuating shaft having a plurality of rotary positions of adjustment corresponding in number to certain indicia of each of said sets, and means movable in accordance with said second shaft for selectively identifying the indicia of each set corresponding to the position of adjustment of said second shaft.

3. An indicator comprising, in combination, an actuating shaft having a plurality of positions of adjustment, a gage member driven by said shaft, said member having a plurality of sets of indicia one set for each of said shaft positions, means associated with said member for selectively identifying each set upon adjustment of said shaft into the corresponding position, a second shaft having a plurality of positions of adjustment corresponding in number to certain indicia of each of said sets, and means driven by said second shaft for selectively identifying the indicia of each set corresponding to the position of adjustment of said second shaft.

4. An indicator comprising, in combination, a shaft having a plurality of rotary positions of adjustment, a dial having a plurality of circumferentially spaced sets of indicia, one set for each of said positions, reducing gearing for driving said dial from said shaft, means associated with said dial for selectively identifying each set upon adjustment of said shaft into the corresponding position, an element having two positions of adjustment, each of said sets comprising two laterally alined indicia corresponding respectively to the positions of said element, and means for selectively identifying the indicia of each set corresponding to the position of adjustment of said second element.

5. An indicator comprising, in combination, an adjustable element, a second adjustable element, each of said elements being separately operable into any operative position of adjustment entirely independently of the other of said elements, and common gage means for indicating the composite setting of said elements.

6. An indicator comprising, in combination, an adjustable machine element having an odd number of positions, a second adjustable element having two positions, and gage means for indicating the composite setting of said elements, said gage means having two indicia for each setting of said machine element and corresponding to the respective positions of said second element.

7. An indicator comprising, in combination, a primary actuator having a plurality of positions of adjustment, a secondary actuator having two positions of adjustment, a gage plate operatively connected to said primary actuator for movement in timed relation thereto, two series of indicia on said gage plate representing the relative positions of adjustment of said primary actuator for the two positions of adjustment of said secondary actuator, said indicia being arranged in two concentric rows and laterally in pairs, a sight opening overlying said gage plate and adapted to expose said pairs of indicia selectively in accordance with the adjustment of said primary actuator, and means associated with said sight opening and operatively connected to said second actuator for exposing one or the other of the pair of indicia registering at any one time with said opening.

8. An indicator comprising, in combination, a support, a casing on said support, said casing having a removable front cover plate, a shaft journaled in said casing and extending to the front of said plate, a hand actuator on said shaft, a pinion fixed on said shaft within said casing, a gear journaled in said casing and meshing with said pinion, a dial on the front face of said gear, said plate being formed with two sight openings spaced diametrically with respect to said dial, a slide bar extending reciprocably through said casing diametrically across said dial beneath said openings, said bar being formed with two sight openings movable respectively across said first mentioned openings, a shaft journaled in said support, a hand actuator secured to said last mentioned shaft and operatively connected to said bar to reciprocate the latter in accordance with adjustments of said last mentioned shaft, and an even number of pairs of indicia circumferentially spaced on said dial with alternate pairs orientated oppositely and with diametrically opposed pairs movable successively into registration with said first mentioned openings, said last mentioned openings being movable from one to the other of the indicia of each pair underlying said first mentioned openings.

9. An indicator comprising, in combination, a support, a casing on said support, said casing having a removable front cover plate, a shaft journaled in said casing and extending to the front of said plate, a hand actuator on said shaft, a pinion fixed on said shaft within said casing, a gear journaled in said casing and meshing with said pinion, a dial on the front face of said gear, said plate being formed with a primary sight opening, a slide bar extending reciprocably between said dial and said plate across said opening, said bar being formed with a secondary opening movable across said first mentioned opening, a shaft journaled in said support, a hand actuator secured to said last mentioned shaft and operatively connected to said bar to reciprocate the latter in accordance with adjustments of said last mentioned shaft, and two concentric rows of indicia arranged laterally in pairs for movement successively into registration with said primary opening, said secondary opening being movable from one row to the other.

10. An indicator comprising, in combination, a support, a casing on said support, said casing having a removable front cover plate, a shaft journaled in said casing and extending to the front of said plate, a hand actuator on said shaft, a pinion fixed on said shaft within said casing, a gear journaled in said casing and meshing with said pinion, a dial on the front face of said gear, said plate being formed with two sight openings spaced diametrically with respect to said dial, and two series of circumferentially-spaced indicia, each series having an odd number of indicia, the indicia of said respective series being alternated and being orientated in opposite directions so that diametrically opposed indicia will be movable in upright position into registration with said openings.

11. An indicator comprising, in combination, an adjustable actuating element, a rotary dial driven in timed relation to the adjustment of said element, two series of circumferentially-spaced indicia on said dial, each series having an odd number of indicia, the indicia of said respective series being alternated and arranged in diametrically opposed pairs and being orientated in opposite directions, and means coacting with said dial for selectively identifying the pairs of diametrically opposed indicia in accordance with the adjustment of said element.

12. An indicator comprising, in combination, a shaft having a plurality of rotary positions of adjustment, gage means having a plurality of indicia corresponding to the positions of said shaft, a reciprocable slide bar, and a hand actuator secured to said shaft and operatively connected to said bar to reciprocate the latter in accordance with the adjustments of said shaft, said bar being associated with said indicia and having means for identifying the indicia corresponding to the adjustment of said shaft.

RAYMOND M. WOYTYCH.